(12) United States Patent
Hunter

(10) Patent No.: US 6,419,721 B1
(45) Date of Patent: Jul. 16, 2002

(54) COALESCING FILTERS

(75) Inventor: Alex George Hunter, Durham (GB)

(73) Assignee: PSI Global Ltd., Bowburn (GB)

( * ) Notice: Subject to any disclaimer, the term of this patent is extended or adjusted under 35 U.S.C. 154(b) by 0 days.

(21) Appl. No.: 09/676,008

(22) Filed: Sep. 29, 2000

Related U.S. Application Data

(63) Continuation of application No. PCT/GB99/00861, filed on Apr. 1, 1999.

(30) Foreign Application Priority Data

Apr. 3, 1998 (GB) .............................................. 9807272

(51) Int. Cl.[7] .............................................. B01D 39/14
(52) U.S. Cl. .......................... 55/486; 55/356; 55/487; 55/495; 55/505; 55/510; 55/522; 55/524; 55/527; 55/DIG. 5; 55/DIG. 25; 95/287
(58) Field of Search .......................... 55/482, 486, 487, 55/495, 498, 503, 505, 511, 522, 524, 527, DIG. 25, DIG. 5, 356, 510; 95/286, 287

(56) References Cited

U.S. PATENT DOCUMENTS

| | | | | |
|---|---|---|---|---|
| 4,159,360 A | * | 6/1979 | Kim ............................ 428/195 |
| 4,231,768 A | | 11/1980 | Seibert et al. |
| 4,304,580 A | * | 12/1981 | Gehl et al. .................... 55/482 |
| 4,376,675 A | * | 3/1983 | Perrotta ....................... 162/145 |
| 4,443,233 A | * | 4/1984 | Moran .......................... 55/525 |
| 4,564,377 A | * | 1/1986 | Kocatas ................. 55/DIG. 25 |
| 4,915,714 A | * | 4/1990 | Teague et al. ................. 55/486 |
| 5,045,094 A | * | 9/1991 | Paranjpe ...................... 55/487 |
| 5,129,923 A | * | 7/1992 | Hunter et al. ................. 55/486 |
| 5,167,765 A | * | 12/1992 | Nielsen et al. .............. 162/146 |
| 5,580,459 A | | 12/1996 | Powers et al. |
| 5,662,728 A | * | 9/1997 | Groeger ....................... 55/524 |
| 5,800,584 A | * | 9/1998 | Hinderer et al. .............. 55/482 |
| 5,961,678 A | * | 10/1999 | Pruette et al. ................ 55/487 |
| 6,007,608 A | * | 12/1999 | Johnson ....................... 55/486 |
| 6,103,181 A | * | 8/2000 | Berger ................... 264/172.14 |
| 6,322,604 B1 | * | 11/2001 | Midkiff ....................... 55/486 |

FOREIGN PATENT DOCUMENTS

| | | |
|---|---|---|
| GB | 2261830 | 6/1993 |
| WO | 8907484 | 8/1989 |

* cited by examiner

*Primary Examiner*—Duane Smith
*Assistant Examiner*—Jason M. Greene
(74) *Attorney, Agent, or Firm*—Baker Botts LLP

(57) ABSTRACT

A filter is provided for coalescing droplets of oil in a stream of gas, comprising an oil coalescing layer of a microfibrous material and a second layer of an oil drainage material located downstream of and in face to face contact with the first layer. The drainage layer is for receiving oil from the coalescing layer and providing a path for oil to flow by gravity from the filter. Oil carry-over is reduced by providing a drainage layer which is a non-woven felt or wadding thermally bonded by bi-component polyester fibers.

22 Claims, No Drawings

COALESCING FILTERS

The present application is a continuation of PCT/GB99/00861, filed. Apr. 1, 1999, now WO99/57319.

BACKGROUND OF INVENTION

The present invention relates to an improved coalescing filter and to its use for the removal of oil droplets from an airstream e.g. from an oil-lubricated compressor or vacuum pump or in an air line.

In air purification systems, primary separation filters (coalescing filters) are commonly provided downstream of an oil lubricated compressor (see U.S. Pat. No. 4,231,768, Pall Corporation). Coalescing filters are also commonly fitted to vacuum pumps for purifying the air stream from the exhaust side of the pump. In either case, the filter is likely to be challenged by a stream of air containing oil in the form of an aerosol of particle size 0.01–50 μm, though the filter may also be arranged for fluid flow in an out-to-in direction. The air stream is usually passed in an in-to out direction through a tubular filter having two working components, a layer within which the oil droplets coalesce and a drainage layer which collects the oil leaving the coalescing layer and retains it until it drips by gravity from the filter. The coalescing layer may be of borosilicate glass microfibres (see GB-A-1603519, the disclosure of which is incorporated herein by reference). The drainage layer may be provided by a porous sleeve of plastics foam or by a non-woven fabric. Coalescing filters may be used with their axes vertical or horizontal.

Coalescing filters commonly spend their service lives wetted out with oil, and the problem of production of secondary aerosols from such filters is disclosed, for example, in GB-A-2177019 (Pall Corporation). One avenue of research has been to try to reduce oil-carry-over from a coalescing filter by improving the drainage layer.

A known drainage layer material with low carry-over is an open-celled polyurethane foam having about 60 pores/inch and an acrylic coating to provide resistance to chemical attack. The layer may also be coloured with a dye or pigment to indicate the grade of filter. The material has the advantage that its pore structure can be made very uniform which assists drainage and reduces the tendency for oil blisters to form in the exterior of the drainage layer which can be expanded and burst by the stream of compressed air. However, in other respects the properties of the material are poor. Its maximum working temperature is 60° C. whereas for many applications an ability to withstand 120° C. is necessary. It has poor resistance to contaminants in the oil and is attacked by some of the newer diester synthetic oils. It is easily damaged through handling and becomes brittle on exposure to UV light.

Our WO 89/07484 discloses another solution of the oil carry-over problem based on the impregnation of the drainage layer with a fluorocarbon or other low surface energy material. As a result, the region of the drainage layer that is wetted out with oil becomes smaller. Treatment of both foams and felts is disclosed. A practical embodiment of that invention employs a drainage layer of an non-woven fabric which is a 50:50 blend of nylon (3.3 d.tex) and polyester (5.3 d.tex) with an acrylic binder and fluorochemical finish. The weight of the drainage layer is 252 g/m² and thickness 3.2–3.5 mm. However, we have found that this material has limitations arising from the way in which it is made. During the manufacturing process, the fibres are formed into a web which is subsequently heavily needled, after which it is dipped into an acrylic binder and finally passed through a fluorochemical dip in order to reduce the surface energy of the resulting structure. The heavy needling leaves visible holes in the fabric. In use of the filter, oil emerges through the holes and forms droplets at the surface of the fabric which become exploded by the following stream of air, causing oil re-entrainment and poor separation performance.

A problem with which the invention is concerned is to provide a coalescing filter whose drainage layer is simple to make, in use gives air with low oil carryover, and can be operated a temperatures above 60° C., and are resistant to light and to chemical attack.

That problem is solved, according to the invention, by providing a filter for coalescing droplets of oil in a stream of gas, comprising an oil coalescing layer of a microfibrous material and at least a second layer of an oil drainage material located downstream of the first layer, said at least one drainage layer being for receiving oil from the coalescing layer and providing a path for oil to flow by gravity from the filter, characterised in the at least one drainage layer is a non-woven felt or wadding thermally bonded by fusible fibres. The aforesaid filter may be tubular and have a coalescing layer which fits within a drainage sleeve, coalesced oil draining from the sleeve which is of a coarser porosity than the coalescing layer.

The coalescing layer may be of glass microfibres or other inorganic material, e.g. borosilicate glass microfibres and may be moulded, wrapped or pleated. It may also be of organic microfibres e.g. polyester fibres.

The drainage layer may be in face to face contact with the coalescing layer or there may be a gap between them, and there may be a single drainage layer or a plurality of drainage layers through which the gas passes sequentially. The drainage layer may have a weight of 100–300 g/m², typically about 200 g/m², and a thickness of about 2–7 mm, typically about 5 mm. The fibres of the drainage layer advantageously have minimal intra-fibre and inter-fibre affinity for oil or other contaminants, and can be formed into a dimensionally stable felt or wadding of reproducible pore size with little or no needling. For reduced affinity for contaminants, nylon fibres (which absorb water) are not used and the drainage layer comprises inert e.g. polyester fibres only. For satisfactorily dimensional stability it has been found that typically about 10–15 wt % of the fibres of the drainage layer should be fibres which are wholly or or partly fusible, e.g. bi-component thermally bondable fibres. If the proportion of bi-component or other fusible fibres is less than 5%, there is little bonding, whereas if there are more than 25% the bonded fabric becomes very stiff. We have found that the minimal needling and thermal bonding the resulting fabric has a generally uniform pore size which reduces or prevents preferential local oil through-flow. The drainage layer material may on its intended outer face be subjected to a conventional treatment intended to reduce outwardly projecting fibres which provide return paths for oil to the air stream. Such treatments include the application of resin and surface heating or singeing, but obstruction of the exit pores of the drainage layer should be avoided. The material may also incorporate a dye or pigment for identification purposes. Embodiments of the drainage layer are resistant to the stress of pulses of air and are resistant to contact, e.g. from the user's fingers, whereas a foam drainage layer exhibits poor resistance to such contact.

The majority fibres of the drainage layer may comprise polyester fibres of more than about 6 d.tex, and suitable fibres currently available are of sizes 7, 17 and 24 d.tex, of which the 17 d.tex size has been found to give the best results, the 7 d.tex fibre size giving a smaller pore structure in which oil may be retained by capillary action. Polyester fibres have been been found to combine the properties of quick absorption of oil droplets into the material, ability to absorb a large mass of oil, quick oil drainage, and low final retention mass leading to a low final wet-band height when the resulting filter is in use.

The bicomponent fibres which are preferred for use in the drainage layer have a relatively high-melting core and a lower-melting sheath e.g. a core which melts at above about 200° C. and a sheath which melts at about 110–175° C. They may comprise about 10 wt % of the fibres of the drainage layer. The felt or wadding may be obtained by forming a loose web of the fibres, and passing the loose web between heated rollers so as to form a structure of an intended thickness and pore size, and it need not contain fluorocarbon. The minority bi-component fibres may be of the same chemical composition as the majority fibres of the drainage layer, or they may be of different composition. They may be of the same diameter as the majority fibres, or they may be larger or smaller, the effect of the relatively low proportion of thermally bondable fibres on the overall pore structure of the drainage layer being significantly less than that of the majority fibres. For example the bi-component thermally bondable fibres may be polyester fibres of the same diameter as the remaining fibres. The following other heat-fusible fibres which are smaller than the majority fibres may be suitable:

(a) PES/PROP 2.2 d.tex×40 mm fibres fusing at temperatures of 130–140° C. and sold under the trade name Damaklon ESC fusible bi-component by Daqmaklon Europe Ltd.

(b) PES 5.5 d.tex×60 mm bi-component fibres fusing at 165–175° C. available from EMS Griltex.

(c) PES 4.4 d.tex×50 mm bi-component T91 Terital fibres fusing at 110–120° C. and available from TBM.

Thus a fabric for a drainage layer may be made from 85 wt % of 17 d.tex polyester fibres and 15 wt % of any of the fibres (a) to (c) above, the fibre mixture being carded, crossfolded, needled, sprayed by means of a spray line successively with nitrile rubber (Synthomer 5046), resin (BT 336, Beatle) and colourant (Artilene Red PBL, Clariant), and passed through an oven to cure the resin.

The filters preferably have end caps which have low affinity for contaminants, and glass-filled nylon which has an undesirably high affinity for water is advantageously not used, PBT or other polyester or metal being preferable end cap material.

A particularly suitable structure for a filter element is disclosed in our GB-B-2261830, the disclosure of which is incorporated herein by reference. That specification concerns a filter element for filtering out oil mist from a gas contaminated therewith and adapted to depend vertically from the head of a filter housing, the element comprising a microporous filter layer for coalescing the oil mist as the gas flows through the filter and a microporous drainage layer into which the coalesced liquid flows. The drainage layer will be of felt or wadding thermally bonded by bi-component fibres as described herein. In use, the coalesced liquid f lows through the drainage layer to the lower end of the filter from which it drains as drops. The filter has an upper end cap for connection to the filter head and provided with a port to admit the stream of oil contaminated gas into the interior of the filter, and a lower end cap which fits tightly to the filter layer and closes the lower end of the filter, the filter layer fitting within an upturned flange of the end cap. Particular features of the filter element are that:

(a) the lower end cap has a guard that surrounds and is spaced radially apart from the filter and drainage layers and has an axial extent from a position above to a position below the lower end of the drainage layer, the guard further providing a finger grip to permit the element to be fitted onto or removed from the filter head without a user's fingers contacting the drainage layer;

(b) the lower end of the drainage layer passes between the upturned flange of the lower end cap and the guard and terminates at an axial position below the filter layer, and (c) portions of the lower end cap extend between the guard and the upturned flange so that the guard is supported in position, said portions permitting generally unobstructed drainage of droplets from the drainage sleeve, whereby in use the height of the oil saturated band which forms at the lower region of the drainage layer is reduced.

The invention also includes an oil-lubricated compressor or vacuum pump provided with an oil-coalescing filter as aforesaid. The invention also provides a process for purifying air from an oil lubricated compressor or vacuum pump which comprises passing the air through a coalescing filter as aforesaid.

An embodiment of the invention will now be described in the following Example.

EXAMPLE

A tubular microfibre coalescing element based on glass microfibres of diameter 0.5–10 m and aspect ratio 500:1–4000:1 using the moulding procedure of our GB-A-1603519. The element had an inside diameter of 75 mm, an outside diameter of 95 mm and a length of 250 mm. It was impregnated with a phenolic resin and cured in an oven, after which the ends were sanded flat.

A drainage layer was made from a 200 g/m$^2$ thermally bonded 17 d.tex polyester needlefelt (available from Lantor (UK) Limited) crushed to a thickness of 5 mm and formed into a sleeve which fits over the coalescing layer. The drainage layer, when inspected by eye, had a uniform appearance without visible holes from needling. The resulting tubular structure was fitted with steel end caps to form a filter element for in-to-out air or gas through-flow.

The filter element was placed with its axis horizontal in a filter housing and challenged with air from an oil-lubricated rotary vane. When compared to a filter having a conventional needled polyester drainage layer, the present filter exhibited reduced spittng and oil carry-over.

The filter may be used with its axis vertical instead of horizontal, e.g. as described in GB-B-2261830.

A filter element of similar structure and with the layers reversed may be formed for gas flow in an out-to-in direction. In that case, an end cap of the filter may be provided with a fitting for an oil return line leading from the interior of the filter.

What is claimed is:

1. A filter for coalescing droplets of oil in a stream of gas, comprising an oil coalescing layer of a microfibrous material and a second layer of an oil drainage material located downstream of the first layer, said drainage layer being for receiving oil from the coalescing layer and providing a path for oil to flow by gravity from the filter, characterised in that the drainage layer is a non-woven felt or wadding comprising a majority of inert fibres thermally bonded by a minority of fusible bi-component fibres and obtainable by forming a loose web of the fibres under heat and pressure to an intended thickness and pore size.

2. The filter of claim 1, wherein the non-woven felt or wadding is bonded by bi-component polyester fibres.

3. The filter of claim 1, which is tubular and has a coalescing layer which fits within a drainage sleeve, coalesced oil draining from the sleeve which is of a coarser porosity than the coalescing layer.

4. The filter of claim 1, wherein the coalescing layer is of glass microfibres or other inorganic material.

5. The filter of claim 4, wherein the coalescing layer is of borosilicate glass microfibres and is moulded, wrapped or pleated.

6. The filter of claim 1, wherein the drainage layer has a weight of 100–300 g/m$^2$.

7. The filter of claim 6, wherein the drainage layer is of weight about 200 g/m$^2$.

8. The filter of claim 1, wherein the drainage layer has a thickness of about 2–10 mm.

9. The filter of claim 8, wherein the drainage layer has a thickness of about 5 mm.

10. The filter of claim 1, wherein the drainage layer comprises fibres of more than about 6 d.tex.

11. The filter of claim 1, wherein the drainage layer comprises fibres of size about 17 d.tex.

12. The filter of claim 1, wherein the bicomponent fibres of the drainage layer have a core which melts at above about 200° C. and a sheath which melts at about 120–150° C.

13. The filter of claim 1, wherein the bicomponent fibres comprise about 10–15 wt % of the fibres of the drainage layer.

14. The filter of claim 1, wherein the felt or wadding is obtainable by forming a loose web of the fibres, and passing the loose web between heated rollers so as to form a structure of an intended thickness and pore size.

15. The filter of claim 1, having end caps of PBT or other polyester or metal.

16. The filter of claim 1, wherein the oil coalescing layer and the second layer of an oil drainage material are located in face-to-face contact.

17. A compressor or vacuum pump provided with an oil-coalescing filter as defined in claim 1.

18. A process for purifying air from a rotary vane compressor or vacuum pump which comprises passing the air through the coalescing filter of claim 1.

19. The process of claim 18, wherein the coalescing filter is in a location where its working temperature is more than 60° C.

20. A filter for coalescing droplets of oil in a stream of gas, comprising an oil coalescing layer of a microfibrous material and a second layer of an oil drainage material located downstream of and in face to face contact with the first layer, said drainage layer being for receiving oil from the coalescing layer and providing a path for oil to flow by gravity from the filter, characterised in that the drainage layer is a felt or wadding comprising a majority of inert fibres thermally bonded by a minority of bi-component or other thermally fusible fibres and obtainable by forming a loose web of the fibres under heat and pressure to an intended thickness and pore size, said inert fibres being polyester fibres and said drainage layer having a weight of 100–300 g/m$^2$ and a thickness of about 5 mm.

21. A filter element for filtering out oil mist from a gas contaminated therewith and adapted to depend vertically from the head of a filter housing, the element comprising a microporous filter layer for coalescing the oil mist as the gas flows through the filter and a microporous drainage layer into which the coalesced liquid flows, in use the coalesced liquid flowing through the drainage layer to the lower end of the filter from which it drains as drops, said filter having an upper end cap for connection to the filter head and provided with a port to admit the stream of oil contaminated gas into the interior of the filter, and a lower end cap which fits tightly to the filter layer and closes the lower end of the filter, the filter layer fitting within an upturned flange of the end cap, wherein (a) the lower end cap has a guard that surrounds and is spaced radially apart from the filter and drainage layers and has an axial extent from a position above to a position below the lower end of the drainage layer, the guard further providing a finger grip to permit the element to be fitted onto or removed from the filter head without a user's fingers contacting the drainage layer;

(b) the lower end of the drainage layer passes between the upturned flange of the lower end cap and the guard and terminates at an axial position below the filter layer, (c) portions of the lower end cap extend between the guard and the upturned flange so that the guard is supported in position, said portions permitting generally unobstructed drainage of droplets from the drainage sleeve ; characterised in that (d) the drainage layer is a non-woven felt or wadding comprising a majority of inert fibres thermally bonded by a minority of fusible bi-component fibres and obtainable by forming a loose web of the fibres under heat and pressure to the intended thickness and pore size.

22. A filter for coalescing droplets of oil in a stream of gas, comprising an oil coalescing layer of a microfibrous material and a second layer of an oil drainage material located downstream of the first layer, said drainage layer being for receiving oil from the coalescing layer and providing a path for oil to flow by gravity from the filter, characterised in that the drainage layer is a non-woven felt or wadding comprising a majority of inert fibres thermally bonded by a minority of fusible bi-component fibres and obtainable by forming a loose web of the fibres under heat and pressure to an intended thickness and pore size, and said drainage layer containing substantially no fluorocarbon.

* * * * *